United States Patent Office 2,748,330
Patented May 29, 1956

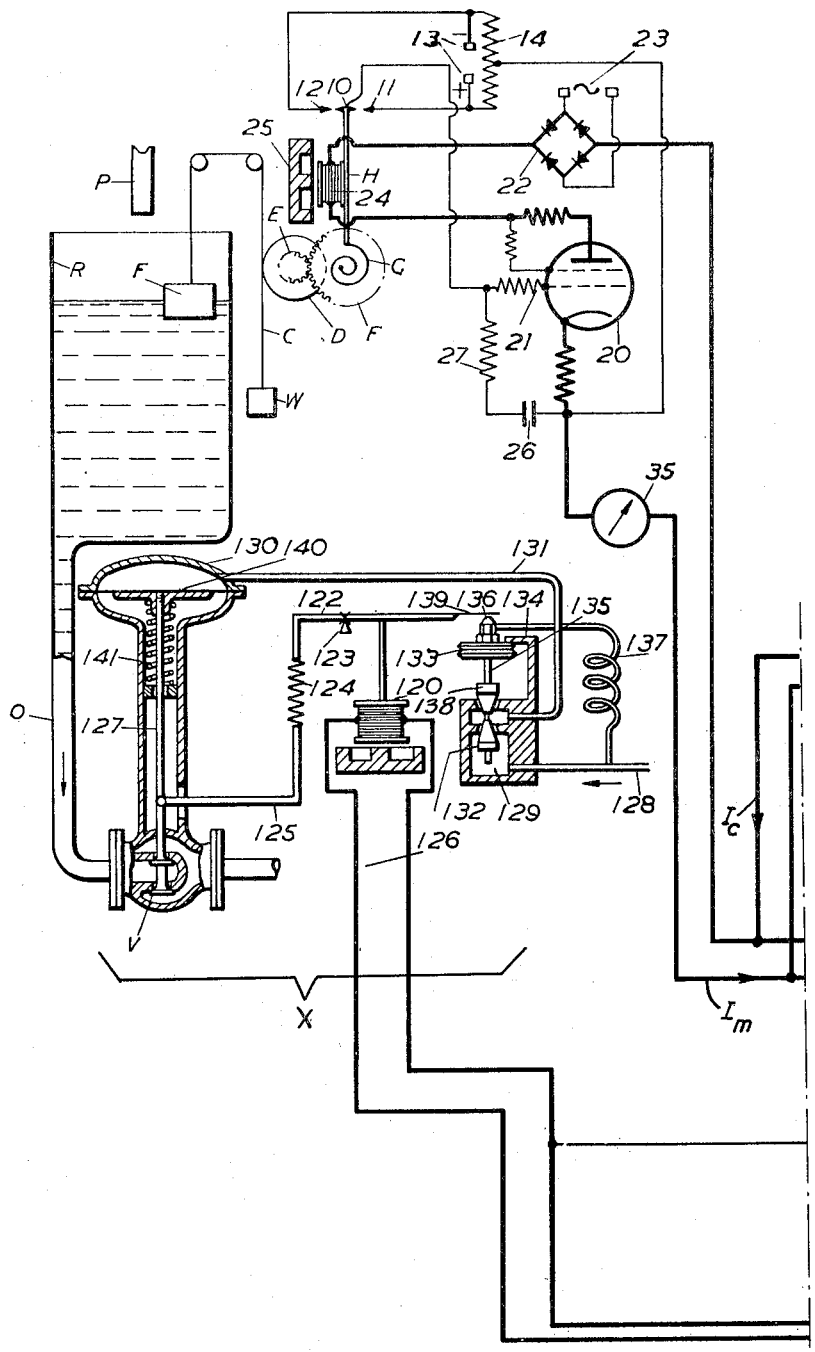

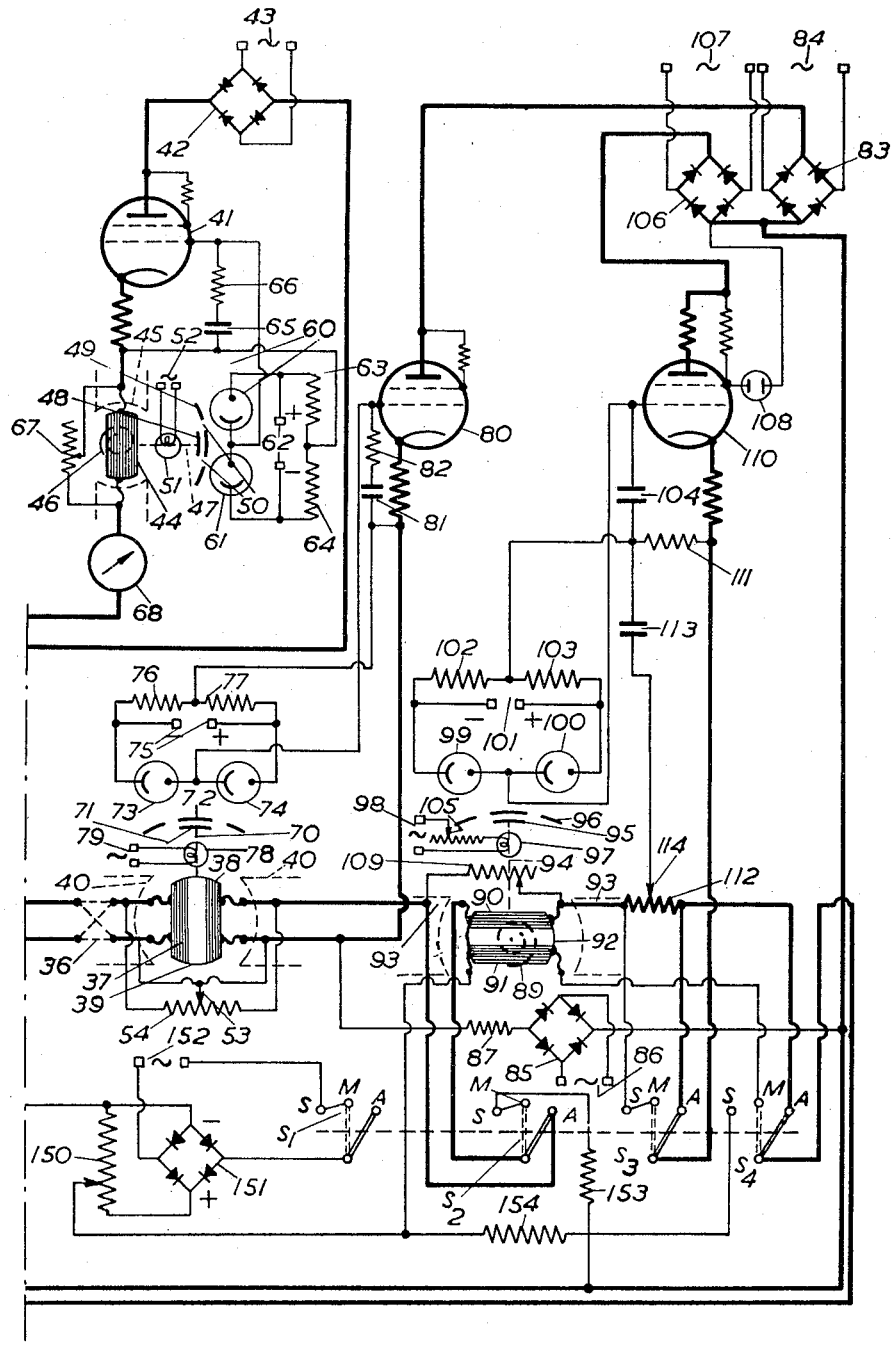
FIG.1.A.

2,748,330

PROPORTIONAL BAND ADJUSTING ELECTRICAL CONTROL APPARATUS

Stephen Archbold Bergen, London, England, assignor to Evershed & Vignoles Limited, London, England, a British company Application March 28, 1952, Serial No. 279,157

Claims priority, application Great Britain April 11, 1951

11 Claims. (Cl. 318—22)

This invention relates to electrically-actuated apparatus for controlling physical quantities which are subject to variation. Thus, in general, the invention is concerned with controllers for use in maintaining a system in a state of equilibrium, and which are brought into operation upon the departure from a datum value of some physical quantity, whose value is determined by the setting of the system. In particular, the invention is concerned with controllers of the same general kind as that described in patent application No. 171,994 filed July 3, 1950, now Patent No. 2,728,041, issued December 20, 1955 and the considerations involved will first be considered in detail in their relationship to this particular form of controller.

In the above-mentioned application, the principal problem dealt with is the provision of a proportional band setting unit, adjustable over a range which is independent of the current produced by the transmitter so as to achieve any desired degree of sensitivity. To this end, the current from the transmitter is caused to flow through one of a pair of coils so coupled and arranged that when the current in the one coil changes, the current in the other coil changes correspondingly. The current in the second coil is caused to affect directly or indirectly the power receiver, and the proportional band is then adjusted by appropriate shunting of either one or both coils. In the particular example described, this form of proportional band setting is applied to a proportional plus integral plus derivative controller, but it is equally applicable either to a simple proportional controller or to a proportional plus integral controller.

If, during the operation of a controller having a proportional band setting of the kind just described, it is necessary to adjust the proportional band, an appropriate adjustment is made in the shunting of the two coils. Since the current from the transmitter is not affected in any way, there is a sudden and abrupt change in the current fed to the power receiver. If, for example, the proportional band is halved, then the current fed to the power receiver is instantaneously doubled, causing a very abrupt alteration in the operating conditions and temporarily, at least, upsetting the stability of operation..

A similar problem is experienced in other types of electrically-actuated controllers provided with a proportional band setting, since any change in the setting inevitably produces a corresponding change in the current fed to the power receiver. The object of the present invention, therefore, is to arrange that the proportional band setting of any such controller may be adjusted during operation without the production of any appreciable shock to the system.

According to the present invention, the power receiver of a proportional plus integral controller of the same general kind as that already referred to is controlled by a current which under equilibrium conditions is directly proportional to the integral with respect to time of the variation of the physical quantity from its datum value and has no component which is proportional to the variation itself. Thus under these equilibrium conditions, any change in the proportional band will not affect this integral and no change will be experienced in the current fed to the power receiver, so that the shock to the system is obviated.

This result is achieved in practice by deriving a current which is proportional to the error in the system at any time and integrating this to give a current which is fed to the power receiver. Since the error at any time is equal to the difference between the measured value of the physical quantity and the desired value (which is a constant), the integral of the error differs only from the integral of the measured value by a constant term. Thus the integral of the error may be used to replace the integral of the measured value in controlling the power receiver. The proportional band setting is applied to the current representing the error, and since under equilibrium conditions this is zero, a change of the setting produces no immediate result. Its effect is, of course, appreciated as soon as any error is introduced, but under these conditions this effect is gradual and not abrupt.

In order to obtain a current proportional to the error of the system, a current proportional to the measured value of the physical quantity at any time is opposed by a current correspondingly proportional to the desired value. The resultant current is then integrated to provide the control to the power receiver. The proportional band setting may then be introduced by causing the resultant current, or a proportion of it, to flow in one of a pair of coils coupled and arranged so that when the current in that coil varies, that in the second coil varies correspondingly. The current in the second coil is used to provide the required integral and the proportional band is adjusted by appropriate shunting of either or both coils.

The current in the second coil may be adjusted to vary in accordance with that in the first coil by mounting the pair of coils to turn together in a permanent magnet field system and supplying the second coil from a thermionic valve whose grid potential is controlled in accordance with the angular position of the coils to give an anode current tending to restore the coils to their datum position. In order that the current in the second coil may be arranged to vary on either side of zero in accordance with variations in the current in the first coil, the anode current of the valve is arranged to be opposed by an uncontrolled direct current so that the resultant current in the second coil at any time is represented by the difference of these two currents.

Although a controller in accordance with the invention operates efficiently under normal working conditions, it is nevertheless often desirable when starting working to control the process manually. For example, if the physical quantity is a long way from its desired value when the controller is switched on, it will take some little time to build up the necessary integral current to provide the required degree of control, whereas under manual operation, the system can rapidly be brought to its normal operating state. For this purpose, a direct current derived from a manually-controlled source is used to supply the power receiver as an alternative to the output of the controller, and this current serves to adjust the output of the controller to a corresponding value so that the controller itself is able to be brought into effective operation without undue shock.

A controller in accordance with the invention will now be described in more detail by way of example with reference to the accompanying diagram, in which the main circuits are shown in heavy lines and alternative and control circuits are shown in lighter lines.

Figure 1 of the drawing shows a portion of the system in which the invention is embodied, and Figure 1A shows the remaining portion.

The controller is designed to maintain the level of liquid in a tank or other reservoir R constant at a predetermined level, which may be referred to as the "desired" value. Liquid flows into the reservoir through an inlet pipe P at a rate which may be variable in accordance with external factors, and flows out through an outlet pipe O under the control of a valve V adjusted by means of an electro pneumatic power receiver X. Thus the function of the controller is to adjust the outlet valve V in accordance with changes of the inflow so as to maintain the desired value under all conditions.

For this purpose, a float F on the surface of the liquid transmits the level at any instant by way of a cord C loaded with a weight W to a rotary disc D, around which the cord C passes. The disc D is provided with a pinion E meshing with a second toothed wheel F, which is thereby caused to rotate through a small angle as the level of the liquid in the reservoir R varies. The wheel F carries a coiled spring G, of which the inner end is secured to the wheel, while the outer end carries a light arm H. Thus as the liquid level rises, the disc D is caused to rotate in a counter-clockwise direction, turning the wheel F in a clockwise direction so as to wind up spring G. This tends to move the upper end of the lever H to the right and to cause a double-sided contact 10 carried at the end of the lever to engage a fixed contact 11, which is one of a pair of contacts 11 and 12 arranged on either side of the moving contact 10.

The contacts 11 and 12 are connected respectively to the positive and negative terminals of a source of direct current supply 13, which also supplies a centre-tapped resistance 14. The centre point of the resistance 14 is connected to the cathode of a thermionic valve 20, while the moving contact 10 on the lever arm H is connected by way of a resistance 21 to the grid of the valve. Engagement of the contact 10 with the contact 11, therefore, raises the potential of the grid with respect to the cathode of the valve 20, and allows an increased anode current to flow.

The anode circuit of the valve 20 is supplied by way of a full wave rectifier 22 from a source of alternating current 23, and includes a coil 24 carried by the lever arm H and co-operating with a pot magnet 25. The increase in the anode current of the valve 20 caused by engagement of the moving contact 10 with the fixed contact 11 increases the attraction between the coil 24 and the pot magnet 25, pulling the lever arm H to the left so as to separate contacts 10 and 11. The grid potential of the valve 20 is, however, maintained at its new value by means of a condenser 26 connected in series with a resistance 27 between the grid and cathode of the valve 20. Any fall in the level of the liquid in the reservoir R tends to unwind the spring G, moving the contact 10 into engagement with the contact 12, thus lowering the potential of the grid and reducing the anode current of the valve 20 and hence the force between the coil 24 and the pot magnet 25 until a state of equilibrium is once again reached. It will, therefore, be understood that for a rise of level, the anode current of the valve 20 will increase, and for a fall, it will decrease so that at all times this current represents a measure of the liquid level in the reservoir R. Expressed in other terms, the anode current of the valve 20 may be said to be directly proportional to the measured value of the liquid level.

In addition to the parts already described, the anode circuit of the valve 20 includes an ammeter 35, which, since the anode current is proportional to the liquid level, can be calibrated directly in terms of level. The circuit then passes by way of a reversing switch 36 to a coil 37, which is one of a pair of similar coils 37 and 38 wound on a common former 39 to turn between pole pieces 40. Flowing through the coil 37 in opposition to the anode current of the valve 20, which may be denoted by $Im$, is a constant current $Ic$, which is correspondingly proportional to the desired value of the liquid level. Any form of constant current circuit may be used, but as shown this current $Ic$ is the anode current of a valve 41 supplied by a full wave rectifier 42 from a source of alternating current 43.

The anode current flows through a coil 44, turning between pole pieces 45 against the action of a spiral spring 46. The coil 44 carries a light arm 47 provided with a shutter 48 co-operating with a screen 49 shaped as part of a cylindrical shell and formed with a pair of openings 50. An electric lamp 51, supplied from a source of alternating current 52 permits equal quantities of light to pass through the openings 50 when the shutter 48 is in the central position. Under these conditions, a pair of emission-type vacuum photo-electric cells 60 and 61 connected in series across a source of direct current potential 62 are equally illuminated, and there is thus no potential difference between their mid-point and the junction between a pair of resistances 63 and 64, also connected across the source of direct current 62. The mid-point between the photo-electric cells is connected to the grid of the valve 41, while the junction between the resistances 63 and 64 is connected to the cathode.

Under steady conditions, the torque exerted by the coil 44 is balanced by the spring 46 so that the shutter 48 remains in the central position just described. Any tendency for the current to increase causes the coil 44 to turn in an anti-clockwise direction so as to increase the illumination of the photo-electric cell 61 and partially to decrease the illumination of the cell 60. This increases the current emitted by the cell 61 and decreases the current emitted by the cell 60. The difference between these two currents flows into a condenser 65 connected in series with a resistance 66 between the grid and cathode of the valve 41 so as to decrease the potential of the grid of the valve 41, thus tending to reduce the anode current and again restore equilibrium. If the current tends to fall the reverse procedure occurs, the grid potential is increased and the current is again restored to its constant value. Current passing through coil 44 is thus maintained constant and any tendency to vary is automatically corrected. The coil 44 is, however, provided with a variable shunt 67, whereby any desired proportion of the anode current of the valve 41 may be by-passed. Thus, although the current through the coil 44 is kept constant, the total anode current of the valve 41 may be adjusted at will by means of the shunt 67. This current is measured by an ammeter 68 which may again be calibrated in terms of liquid level. Thus when the desired value for the liquid level in the reservoir R has been chosen the shunt 67 is set to give a corresponding reading of the ammeter 68. When the liquid level is at the desired value, then the resultant current through the coil 37 will be zero and will vary above or below zero according as the liquid level is above or below the desired value. Thus at any instant the current in the coil 37 is proportional to the variation from the desired value, or in other words, the error of the system.

The former 39 on which the coils 37 and 38 are wound carries a light arm 70 provided with a shutter 71 co-operating with a screen 72 in the same manner as the shutter 48 to control the light from a lamp 78 energised by a source of alternating current 79 and thus to control the illumination of a pair of emission-type vacuum photo-electric cells 73 and 74. These are supplied from a source of direct current 75, which also supplies equal resistances 76 and 77. The mid-point between the cells and the junction between the resistances are connected respectively to the grid and to the cathode of a thermionic valve 80, the anode current of which flows through the coil 38 and is supplied by a full-wave rectifier 83 from a source of alternating current 84. A condenser 81 is connected in series with a resistance 82 between the cathode and grid and receives the difference in the currents flowing in the two cells 73 and 74. The photo-cell system, therefore, acts in a similar manner to the system consisting of the cells 60 and 61 so as to restore the shutter 71 to its central position. Since there is no other control to the former 39, the torque exerted by the coil 37 must equal that exerted by the coil 38 in this position, and since these two coils have equal numbers of turns, then the current in the coil 38 is controlled to be equal to that in the coil 37.

According as the error in the system is positive or negative so the current in the coil 37 will flow in one direction or the other, and it is necessary, therefore, that the current in the coil 38 can also reverse under these conditions. Since the anode current of the valve 80 is unidirectional, the necessary reversibility is obtained by connecting in the circuit a full wave rectifier 85 supplied from a source of alternating current 86, and connected in series with a resistance 87. Thus according as the anode current of the valve 80 is greater than or less than the standing current of the rectifier 85, so that the current in the coil 38 flows in one direction or the other. Under balanced conditions, when there is no error in the system, the anode current of the valve 80 will, of course, be exactly equal to the standing current.

The coils 37 and 38 are arranged to be shunted by means of a resistance 54 provided with an adjustable tapping 53. The tapping 53 is connected to one end of both coils 37 and 38, while the ends of the resistance 54 are connected respectively to the other ends of the two coils. In the central position, the two coils are equally shunted, while when the tapping 53 is moved to the left, the coil 37 is shunted to a greater extent than the coil 38 and vice versa. Thus, although the currents in the two coils 37 and 38 are controlled to be equal, the anode current of the valve 80 is not in general equal to the resultant of the anode currents of the valves 20 and 41, but is multiplied by a factor which is equal to the proportional band. Thus the proportional band is simply adjusted by variation of the tapping 53 in the same manner as in the copending application Serial No. 171,994. Under conditions of equilibrium the currents in both the coils 37 and 38 are zero, so that the adjustment has no immediate effect and produces no shock to the system.

Current in the anode circuit of the valve 80, after flowing through the coil 38 passes to contact A of a switch S2. This is one of a set of four similar switches S1 to S4 ganged together and having three positions. The position for automatic operation is denoted by A in each case, that for manual operation by M, while a third position denoted by S is intended for the servicing of the controller. The anode current then flows through a further coil 90, which is one of a pair of similar coils 90 and 91 wound on a common former 92 to turn between permanent magnet pole pieces 93 against the action of a spring 89. The former 92 carries a light arm 94 provided with a shutter 95 co-operating with an apertured screen 96 to control the proportion of light from a lamp 97, energised from a source of alternating current 98, through a variable resistance 105, falling on each of a pair of emission-type vacuum photo-electric cells 99 and 100.

These cells are energised from a source of direct current 101 at a voltage above that corresponding to the saturation current. The cells form two arms of a current bridge of which the other arms are constituted by equal resistances 102 and 103. By reason of the fact that the two cells are operating under saturation conditions, the current which they can carry depends solely on their degree of illumination and does not vary with the applied voltage. Thus any degree of out-of-balance in the illumination of the two cells is represented by a current output from the bridge which is directly proportional to the difference in the illumination of the two cells. This in its turn is proportional to the displacement of the shutter 95 and thus to the current flowing in the coil 90.

The current output from the current bridge is applied to charge a relatively large storage condenser 104, the voltage of which at any time thereby represents the integral with respect to time of the current flowing in the coil 90 and hence of the error in the system. One plate of the condenser is connected to the grid of a thermionic valve 110, while the other plate is connected by way of a resistance 111 to the cathode of this valve. In this way, the anode current of the valve 110 is controlled so as to be proportional to the required integral. The coil 90 is provided with a variable shunt 109 which enables the factor of proportionality to be varied as necessary, and which may be adjusted as an alternative to varying the resistance 105.

Adjustment of the shunt 109 varies the deflection for a given current, whereas adjustment of the resistance 105 varies the out-of-balance illumination for a given deflection.

The anode current of the valve 80, after flowing through the coil 90, then flows through a resistance 112 constituting part of a differentiating network which also includes a condenser 113 and the resistance 111, connected in series between a tapping point 114 on the resistance 112 and, through the contact A of the switch S3, the right-hand end of the resistance 112. A voltage proportional to the anode current of the valve 80 is available between these points, and when this current varies a current proportional to the rate of change of the anode current flows into or out of the condenser 104.

The valve 110 has its anode current supplied by a full-wave rectifier 106 from a source of alternating current 107. A neon tube 108 connected between the screen grid of the valve and the negative pole of the rectifier 106 serves to stabilise the screen grid voltage. Thus a voltage proportional to the derivative of the anode current of the valve 80 appears across the resistance 111, and is added to that across the condenser 104 so that the anode current of the valve 110 in addition to the integral component, also includes a derivative component. This derivative component may be varied by adjustment of the tapping 114 and since under conditions of equilibrium there is no current flowing through the resistance 112, thus adjustment can be carried out without shock to the systems. The anode current of the valve 110 flows through the contact A of the switch S3 and then in conjunction with the anode current of the valve 80 flows through the contact A of the switch S4 and thence to the coil 120 of power receiver X.

The total output to the power receiver, therefore, consists of a current proportional to the error in the system, i. e. the current in the coil 38, plus the anode current of the valve 110, which comprises both integral and derivative components. Under normal conditions of balance, both the current proportional to the error and the derivative component will be zero so that the whole of the control will be exerted by the integral component. Under these balanced conditions, the proportional band setting may be adjusted without shock to the system by variation of the tapping 53. Similarly by adjustment of the tapping 114, the derivative component may also be adjusted. Moreover, the integral factor itself can be adjusted by variation of the shunt 109 or the resistance 105. Since no current is flowing through the coil 90, the shutter 95 is in its central position and variation of the shunt produces no immediate effect. As soon as any error exists, of course, all these various adjustments then take effect.

The power receiver X comprises a control coil 120 to which the output of the controller is fed, and which cooperates with a pot magnet 121. The coil 120 is mounted towards one end of a lever arm 122, pivoted at 123, and acts in opposition to a spring 124, which is stressed upon the opening of the valve V by an arm 125 connected to the valve rod 127.

Compressed air is supplied through an inlet pipe 128 to a valve casing 129 and flows through a pipe 131 controlled by the lower member 132 of a double valve to a chamber 130 closed at the bottom by a diaphragm 140 connected to the valve rod 127. This valve is actuated by bellows 133, the upper part of which is carried by a fixed bracket 134 and the lower part of which is attached to the valve spindle 135. An air nozzle 136 leads from the space within the bellows 133 and air is supplied to the nozzle 136 through a long pipe of fine bore 137 leading out of the air supply pipe 128.

The upper valve member 138 on the same spindle as the member 132 controls an outlet from the inside of the valve casing 129 to atmosphere. The end of the lever arm 122 is formed as a blade 139 extending in close proximity over the outlet of the nozzle 136. In the balanced condition, air escapes from the nozzle 136 at a certain speed past the blade 139 but causes the bellows 133 to be partially expanded, with the valve members 132 and 138 in an intermediate position. This allows the air pressure from the pipe 128 to be partially throttled before reaching the pipe 131 and allows some air to escape to atmosphere past the valve member 138. Thus the pressure in the chamber 130 above the diaphragm 140 is balanced by the pressure of a spring 141 and holds the valve V in the adjusted position.

If, however, the output of the controller and hence the current in the coil 120 decreases, the lever 122 is rocked in a counter-clockwise direction so that the blade 139 moves slightly away from the nozzle 136. This allows the pressure in the bellows 133 to fall somewhat so that the bellows tends to close, partially closing the valve member 132 and opening the valve member 138. Therefore, the air supply to the pipe 131 is more fully throttled and there is a greater escape to the atmosphere, so that the pressure on the top of the diaphragm 140 is reduced and the spring 141 closes the valve V to decrease the outflow from the reservoir R. If the output of the controller is increased, the reverse procedure occurs.

Although in this particular example the valve V which controls the outflow from the reservoir R in accordance with variations in the rate of inflow is an outlet valve, it is, of course, quite possible to control an inlet valve in accordance with variations in the rate of outflow. In this event, of course, the operation of the controller has to be reversed so that for a rise in liquid level, the valve is closed, while for a fall, it is opened. The reversing switch 36 is provided for this purpose and serves to reverse the sense of the current to the coil 37 so that the whole controller operates in reverse to provide the necessary control.

As previously mentioned, it is desirable to provide an alternative manual control for the power receiver X which can be brought into operation, for example, when starting working. Thus, if the reservoir R is initially empty when the controller is switched on, it will take some little time to build up the necessary integral current to provide the required degree of control, whereas under manual operation, the system can rapidly be brought to its normal operating condition.

It is for this purpose that the switches S1 to S4 are provided. A hand-operated potentiometer 150 is energised from a full-wave rectifier 151 supplied from a source of alternating current 152 by way of the M contact of the switch S1. Thus when the switches are set for automatic operation, the potentiometer 150 is de-energised and is energised when the switches are set to the manual position. The negative pole of the potentiometer supplies the power receiver X directly, while the supply from the positive pole passes first through the coil 91 wound on the former 92, and thence by way of the M contact of the switch S4 to the power receiver X.

Movement of the switch S4 to the manual position interrupts the passage of the output of the controller itself to the power receiver. The anode current of the valve 110 is diverted by the switch S3 to a point to the left-hand side of the resistance 112 and then flows in opposition to the normal direction of flow through the coil 90 and then returns by way of the M contact of the switch S2 via a resistance 153, which acts as a dummy load in place of the power receiver X.

The effect of the current from the potentiometer 150 passing through the coil 91 is to unbalance the bridge circuit comprising the photo-electric cells 99 and 100 and thereby to control the anode current of the valve 110. This current passing through the coil 90 tends to restore the balance of the bridge, and since the coils 90 and 91 are similar to one another, when the balance is finally restored, the anode current of the valve 110 is equal to the output of the potentiometer 150. Thus as the potentiometer 150 is adjusted manually to bring the system to its normal operating condition, so the anode current of the valve 110 is automatically adjusted in step. Thus when the switches S1 to S4 are returned to the position for automatic operation, the valve 110 is in a state of readiness to take over control without any shock to the system.

The switches S1 to S4, in addition to the automatic and manual positions, have a third position for servicing purposes denoted by the reference letter S. In switches S1, S2 and S3, this is directly connected to the M terminal so that no difference of effect is obtained. The effect of moving switch S4 to the S position, however, is to remove the coil 91 from the circuit and to insert in its place an equivalent resistance 154. Under these conditions, no control is exerted on the anode current of the valve 110 so that the whole bridge circuit and the moving coil system 92 is dead and may be removed temporarily from the circuit for servicing purposes. As soon as the servicing is complete, the switches are changed back to the manual position, when the anode current of the valve 110 is rapidly brought up to the value of the output current of the potentiometer 150.

Although described in terms of the control of liquid level, the controller may be used in any equivalent type of process plant. It is only necessary that an input current Im proportional to the measured value of the quantity to be controlled should be available and the controller will then provide the necessary output current for control purposes. For example the wheel F may be turned in accordance with the magnitude of a physical quantity which is to be controlled and any form of current-operated power receiver may also be substituted for that shown at X.

I claim:

1. In an electric control system for controlling the magnitude of a physical quantity subject to variation from a desired value, the combination of means for producing a first electric current proportional to the magnitude of the departure of said physical quantity from said desired value, means for producing a second electric current proportional to said first electric current, means for varying the proportionality between said first and second electric currents, means controlled by said second electric current for establishing a third electric current conforming with the integral with respect to time of said second electric current, and electro-motive means controlled by said second and third electric currents and producing a response proportional to the sum of said second and third electric currents and adapted to control a device affecting the magnitude of said variable quantity.

2. In an electric control system for controlling the magnitude of a physical quantity subject to variation from a desired value, the combination of means for producing an electric current proportional to the magnitude of the variable physical quantity, means for producing a second electric current correspondingly proportional to said desired value of the variable physical quantity, a first coil, means for supplying said coil with current of a value equal to the difference between said electric currents, a second coil, shunting means for each of said coils, a source of electric current supplying said second coil, means for controlling the current in said second coil in dependence on the current in said first coil, means controlled by the electric current from said source for establishing a further current component conforming with the integral with respect to time of said electric current from said source, and electromotive means responsive to the sum of the current from said source and said further current component and being adapted to control a device affecting the magnitude of said variable quantity.

3. An electric control system as claimed in claim 2, in which said shunting means comprise a resistance connected between one end of said first coil and one end of said second coil and a manually actuated tapping contact on said resistance, said tapping contact being connected to the other ends of said coils.

4. In an electric control system for controlling the magnitude of a physical quantity subject to variation from a desired value, the combination of means for producing an electric current whose value varies with the magnitude of the departure of said physical quantity from said desired value, a pair of coils, shunting means for said coils, means mounting said pair of coils to turn together in a magnetic field, means for supplying said electric current to the first of said pair of coils, a thermionic tube having a control grid and an anode circuit supplying said second coil, means controlled in accordance with the angular displacement of said pair of coils for adjusting the grid potential of said thermionic tube to provide an anode current such as to return said pair of coils to a centralised position, means controlled by the anode current of said thermionic tube for establishing a further current component conforming with the integral with respect to time of said anode current, and electromotive means responsive to the sum of said anode current and said further current component and adapted to control a device affecting the magnitude of said variable quantity.

5. An electric control system as claimed in claim 4, in which the means controlled in accordance with the angular displacement of said pair of coils comprises a pair of photo-electric cells, a source of direct current potential connected in series with said cells, means controlled in accordance with the angular displacement of said pair of coils for regulating the differential illumination of said cells, a condenser connected between the grid and cathode of said thermionic tube, and means connecting said condenser to be charged by the difference of the currents flowing in the two cells.

6. An electric control system as claimed in claim 5, and comprising in addition a source of direct current connected in opposition to the anode circuit of said thermionic tube to supply said second coil whereby the resultant current in said second coil may vary in direction in accordance with the current in said first coil.

7. An electric control system for use in a regulating system in which the magnitude of a physical condition is subject to variation from a datum value and in which the magnitude of the same physical condition may be varied by control means having a moving member, the combination of a transmitter responsive to said physical condition and producing an electric current whose value varies with the magnitude of said condition, means for producing a second electric current whose value is correspondingly proportional to said datum value of said condition, means for producing a current proportional to the difference of said two currents, means for varying the factor of proportionality of said difference current, a current bridge, means controlled by said difference current for regulating the output of said current bridge, a condenser connected to be charged by the output current of said bridge, a thermionic tube having a control grid, said condenser being connected between the grid and the cathode of said tube whereby the anode current of said tube has a component proportional to the integral with respect to time of said difference current, and a current-operated control device adapted to operate said movable member and being energised by the sum of said difference current and the anode current of said thermionic tube.

8. An electric control system as claimed in claim 7, in which the current bridge comprises a pair of emission-type vacuum photo-electric cells, a source of direct current voltage sufficient to produce the saturation current in said cells, said cells being connected in series across said source of direct current voltage, a pair of equal resistance arms, a moving coil turning in a magnetic field, said moving coil being connected to carry said difference current, and means controlled in accordance with the angular position of said moving coil for varying the differential illumination of said photo-electric cells.

9. An electric control system as claimed in claim 7, comprising in addition a differentiating network, said differentiating network producing a voltage proportional to the derivative of said difference current, and means for applying said voltage in addition to the voltage across said condenser between the grid and the cathode of said thermionic tube.

10. An electric control system for use in a regulator system in which the magnitude of a physical condition is subject to variation from a datum value and in which the magnitude of the same physical condition may be varied by control means having a movable member, the combination of a transmitter responsive to said physical condition and producing an electric current whose value varies with the magnitude of said condition, means for producing a second electric current whose value is correspondingly proportional to said datum value of said condition, means controlled by the difference of said electric currents for establishing a further current component conforming with the integral with respect to time of said difference, a current-operated control device adapted to operate said movable member, a manually controlled source of direct current, switch means for alternatively supplying said current-operated control device with a combination of the difference of said currents and said further current component or with current from said manually controlled source, and second switch means whereby said means for establishing a further current component conforming with the integral with respect to time of said difference is controlled by the current from said manually controlled source instead of by the difference of said electric currents.

11. An electric control system for use in a regulating system in which the magnitude of a physical condition is subject to variation from a datum value and in which the magnitude of the same basic condition may be varied by control means having a moving member, the combination of a transmitter responsive to said physical condition and producing an electric current whose value varies with the magnitude of said condition, means for producing a second electric current whose value is correspondingly proportional to said datum value of said condition, means for producing a current proportional to the difference of said two currents, means for varying the factor of proportionality of said difference current, a current bridge comprising a pair of emission type vacuum photo-electric cells, a source of direct current voltage sufficient to produce the saturation current in said cells, said cells being connected in series across said source of direct current voltage and a pair of equal resistance arms, a pair of coils, means mounting said coils for rotation in a magnetic field, means controlled in accordance with the angular position of said coils for varying the differential illumination of said photo-electric cells to control the balance of said current bridge, a condenser connected to be charged by the output current of said bridge, a thermionic tube having a control grid, said condenser being connected between the grid and the cathode of said tube whereby the anode current of said tube has a component proportional to the integral with respect to time of said difference current, a manually controlled source of direct current, a current-operated control device adapted to operate said movable member, switch means for energising said current-operated control device alternatively with a combination of said difference current and the anode current of said thermionic tube, or with current from said manually controlled source, second switch means operated in conjunction with said first switch means for supplying said first coil alternatively with said difference current or with the anode current of said thermionic tube in the opposite sense to said difference current, and third switch means operated in conjunction with said first and second switch means for supplying the current from said manually controlled source to said second coil.

References Cited in the file of this patent

UNITED STATES PATENTS

| | | |
|---|---|---|
| 1,993,527 | Mears et al. | Mar. 5, 1935 |
| 2,282,726 | Jones | May 12, 1942 |
| 2,483,450 | Wolfner | Oct. 4, 1949 |
| 2,495,844 | Hornfeck | Jan. 31, 1950 |
| 2,525,967 | Smoot | Oct. 17, 1950 |
| 2,556,065 | Callender | June 5, 1951 |

OTHER REFERENCES

General Electric Review, Dec. 1951, pp. 39–46, vol. 54, issue 12.

Westinghouse Engineer, Sept. 1946, pp. 149–154.